W. J. PETERS.
KEY INDICATOR FOR PIANOS AND ORGANS.
APPLICATION FILED JAN. 7, 1916.
1,270,657.
Patented June 25, 1918.
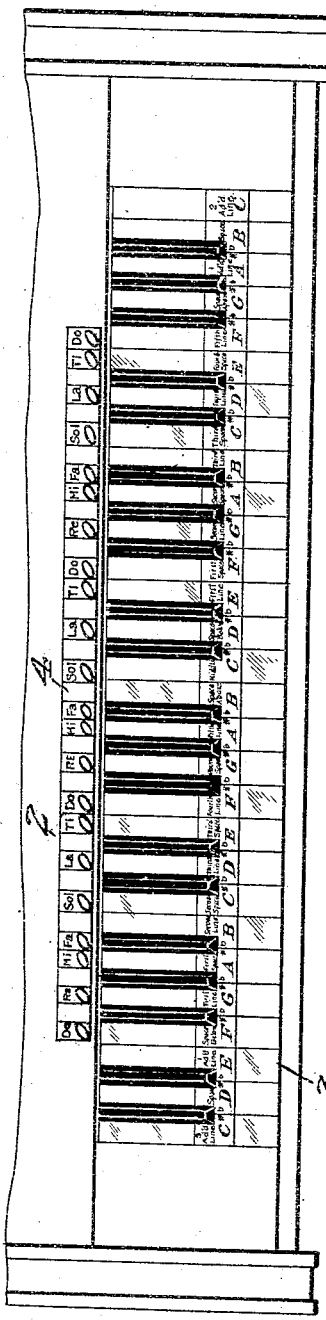
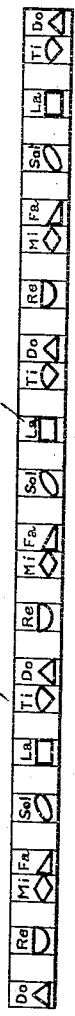
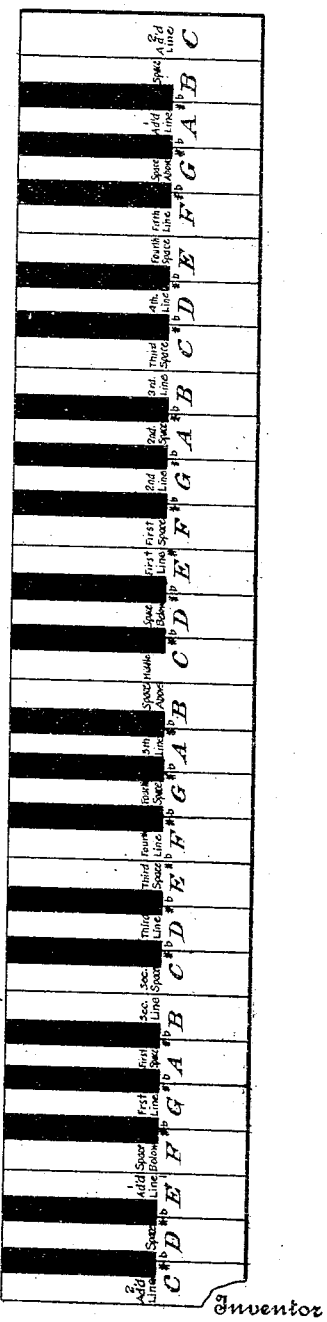
Inventor
Walter J. Peters
By Victor J. Evans
Attorney
Witnesses

UNITED STATES PATENT OFFICE.

WALTER J. PETERS, OF RALEIGH, WEST VIRGINIA, ASSIGNOR OF ONE-HALF TO J. W. FIELD, OF NORTON, VIRGINIA.

KEY-INDICATOR FOR PIANOS AND ORGANS.

1,270,657.  Specification of Letters Patent.  Patented June 25, 1918.

Application filed January 7, 1916. Serial No. 70,853.

*To all whom it may concern:*

Be it known that I, WALTER J. PETERS, a citizen of the United States, residing at Raleigh, in the county of Raleigh and State of West Virginia, have invented new and useful Improvements in Key-Indicators for Pianos and Organs, of which the following is a specification.

This invention relates to music instruction devices and has for its object the provision of key indicating and identifying means applied directly to the keyboard of a piano or organ and comprising indicia indicating the names of the white keys in letters, the position of the keys on the staff and the names of the adjacent black keys: whether sharp or flat.

Figure 1 is a plan view of the keyboard of a pianoforte showing the white keys as marked with my chart and the indicator as disposed across the rear ends of the black keys, the obverse face of said indicator being shown; Fig. 2 is a plan view of the reverse of the indicator; and Fig. 3 is a diagram of the chart on a larger scale.

The chart 1 is best shown in diagram in Fig. 3, and it comprises inscriptions applied to the exposed faces of the white keys along the keyboard 3 of a pianoforte or similar musical instrument, the manner of the application of the inscription being immaterial except that it is intended to remain permanently upon the keys. As shown, these data include a letter, such as for instance C at about the middle of the chart in Fig. 3, a word or words adjacent said letter indicating or designating the line or space on the staff where this note occurs, such as "space above" adjacent the letter B on the next note to the left of that marked C at about the center of Fig. 3, and on the face of the key near the opposite edges thereof a sharp sign at the righthand edge, or a flat sign at the lefthand edge, or both as is the case with the key marked G which is four to the right from middle C in Fig. 3. I preferably dispose these signs on the widest portion of the key so that they will come respectively in front of the black keys to the left and to the right of the white keys. In the example last referred to, the sharp sign indicates that the black key to the right of G is G sharp, and the black key to the left of G is G flat, whereas the key F just to the left of this key would have a sharp sign at its right edge but no flat sign at its left edge because there is no F flat. Thus the chart markings upon the faces of the white keys give their letters or letter names, their positions upon the staff, and the symbols of the adjacent black key or keys. The letters and position may be read in conjunction with the black keys, and yet I avoid the necessity of marking anything on such black keys as all of the markings of the chart are on the white keys alone.

The indicator 2 may well be made of a strip of cardboard or the like inscribed on its obverse 4 with note characters and names and on its reverse 5 with names and special forms of note characters. The respective names and characters are spaced on the strip to correspond with the diatonic scale, so that when the name "do" is placed over middle C for instance, the remaining names will overlie the keys of the natural key; or when the name "do" is placed over F as seen in Fig. 1, the remaining names will overlie the keys of the key of F, or one flat. Thus the indicator may be shifted to assist the student, whatever the key; but it is quite possible to omit this indicator if desired by the student.

What I claim as new is:—

The herein described means for teaching music comprising inscriptions on the faces of the white keys of a keyboard, the inscription on each key including the letter name thereof, a word or words indicating the line or space on the staff where the corresponding note occurs, and flat and sharp symbols, near the side edges of the key adjacent the ends of the contiguous black keys which respectively constitute the sharp and flat notes of the key in question.

In testimony whereof I affix my signature in presence of two witnesses.

WALTER J. PETERS.

Witnesses:
 WILBER ALTON JOHNSON,
 C. F. MALCULM.

Copies of this patent may be obtained for five cents each, by addressing the "Commissioner of Patents, Washington, D. C."